US00RE38707E

(19) United States
(12) Reissued Patent
Merkel

(10) Patent Number: US RE38,707 E
(45) Date of Reissued Patent: Mar. 1, 2005

(54) COMPONENT SHELF SYSTEM

(75) Inventor: Raimund Merkel, Auwiesenstrasse 19, Gernsbach, 76593 (DE)

(73) Assignee: Raimund Merkel (DE)

(21) Appl. No.: 10/185,963

(22) Filed: Jun. 27, 2002

Related U.S. Patent Documents

Reissue of:
(64) Patent No.: 6,126,022
Issued: Oct. 3, 2000
Appl. No.: 09/123,924
Filed: Jul. 28, 1998

(30) Foreign Application Priority Data

Aug. 2, 1997 (DE) ..... 297 13 792 U
May 26, 1998 (DE) ..... 298 09 240 U

(51) Int. Cl.[7] ..... A47F 5/00
(52) U.S. Cl. ..... 211/135; 211/186; 108/60; 108/180
(58) Field of Search ..... 211/135, 186, 211/126.16, 90.04, 187; 108/60, 180

(56) References Cited

U.S. PATENT DOCUMENTS

| | | | | |
|---|---|---|---|---|
| 2,350,280 A | | 5/1944 | Holtzman | 312/261 |
| 2,366,676 A | | 1/1945 | Rosenthal | |
| 3,606,023 A | | 9/1971 | Edmunds | 211/74 |
| 4,062,302 A | | 12/1977 | Krizan | 108/60 |
| 4,082,389 A | | 4/1978 | Stewart | 312/258 |
| 4,373,449 A | | 2/1983 | Klaus et al. | 108/60 |
| 5,145,244 A | | 9/1992 | Kersting et al. | 312/259 |
| 5,279,232 A | | 1/1994 | Gollick | 108/180 |
| 5,787,818 A | | 8/1998 | Letersky | 108/180 |
| 5,855,175 A | | 1/1999 | Forbes | 108/180 |
| 6,126,022 A | * | 10/2000 | Merkel | 211/135 |

FOREIGN PATENT DOCUMENTS

DE 8914430.9 6/1990

* cited by examiner

*Primary Examiner*—Robert W. Gibson, Jr.
(74) *Attorney, Agent, or Firm*—Wood, Herron & Evans, LLP

(57) ABSTRACT

The invention relates to shelving, in particular, shelving consisting of components which are assembled with securing elements. The invention contains a frame having a back wall, a pair of side walls, a top wall and a bottom wall attached to each other with a plurality of tabs and corresponding slots located on the back wall, side walls, top wall and bottom wall. The back wall, side walls, top wall and bottom wall are constructed of folded material which provides rounded edges that limit damage to material stored on the shelf. A securing bore is located on each of the tabs and is milled to a particular diameter corresponding to the type of material used to construct the shelf and the load supported. A plurality of safety bars are inserted through the securing bore located on each of the tabs. The safety bars prevent the removal of the tabs from the corresponding slots and help secure the shelf. In addition, horizontal and vertical compartment divider may be attached to the frame using the same tab and slot method. The additional compartment divides allow for an unlimited number of compartments.

13 Claims, 9 Drawing Sheets

COMPONENT SHELF SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to shelving, in particular, shelving consisting of components which are assembled with securing elements and further comprising vertical and horizontal compartment dividers.

2. The Prior Art

It is known in the art to connect shelves consisting of individual components such as horizontal and vertical compartment dividers, shelf posts and back walls by means of screws, rivets, or by welding. A method frequently employed for assembling shelves comprises securing the shelf bottoms with screws between vertical posts. Another frequently used method is to suspend so-called compartment supports in vertical posts, or to screw such supports into the latter. The individual compartment bottoms are then secured to such supports by means of screws.

Another method for constructing shelves makes use of mounting supports, such as angle sections which are located on vertical walls on the left and right sides having defined spacings. Compartment bottom components of the shelf are then secured to the supports using screws, rivets or welding.

A shelf-like rack with compartment bottoms is known from DE 89 14 430 U1, where a rearward extension of a compartment bottom projects through a slot and into a back wall. The rearward extension has an arresting slot terminating with the back wall. A T-shaped locking element is inserted through the slot, and prevents the compartment bottom from moving. Because of its overall construction, this known rack, which is made from corrugated board, is only suitable for receiving goods of a light weight. Furthermore, the edges in the slide-in area are not rounded.

The known designs of larger shelves all require tools and securing elements to assemble and stabilize the shelves. Furthermore, the compartment divisions formed by the assembly contain sharp edges on all sides. In the corner areas of the compartments, support sections, securing elements or other applications lead to interfering edges that may cause problems when the compartments of the shelf are loaded with sensitive goods, or when the latter are removed from the shelf. In addition, the securing elements may reduce the amount of useable storage space. Furthermore, disposal of those shelves which are no longer needed creates problems.

SUMMARY OF THE INVENTION

It is therefore an object of the present invention to provide a component shelf system which can be easily assembled and stabilized without the help of tools.

It is a further object of the invention to provide a component shelf which has compartments without sharp edges along the circumference, and horizontal and vertical compartment dividers with rounded edges in the slide-in areas. Furthermore, the horizontal and vertical compartment dividers are interwoven with each other at the points of intersection using a splint.

It is a final object to provide a strong shelf made from one type of material.

To achieve these objects, stabilizing elements such as angle sections, screws or rivets have been eliminated. This yields surfaces that extend around the compartment divisions with no sharp edges. Furthermore, in the junctions between the horizontal and vertical compartment divisions, a splint is inserted between the parts of the folded vertical compartment division. This not only increases the stability of the entire shelf with the horizontal compartment divisions, but safely prevents lateral movement of the vertical edges of the vertical compartment divisions.

The invention makes use of two tabs with bores which are arranged on the edges of the side wall and on the horizontal and vertical compartment divisions, through which securing bars are installed in the assembled shelf. Thus it is possible to assure an extremely stable connection between the components of the shelf when the components are assembled and fixed by the securing bars.

BRIEF DESCRIPTION OF THE DRAWINGS

Other objects and features of the present invention become apparent from the following detailed description considered in connection with the accompanying drawings which disclose the embodiments of the present invention. It should be understood, however, that the drawings are designed for the purpose of illustration only, and not as a definition of the limits of the invention.

DETAILED DESCRIPTION OF PREFERRED EMBODIMENTS

Figure 1:
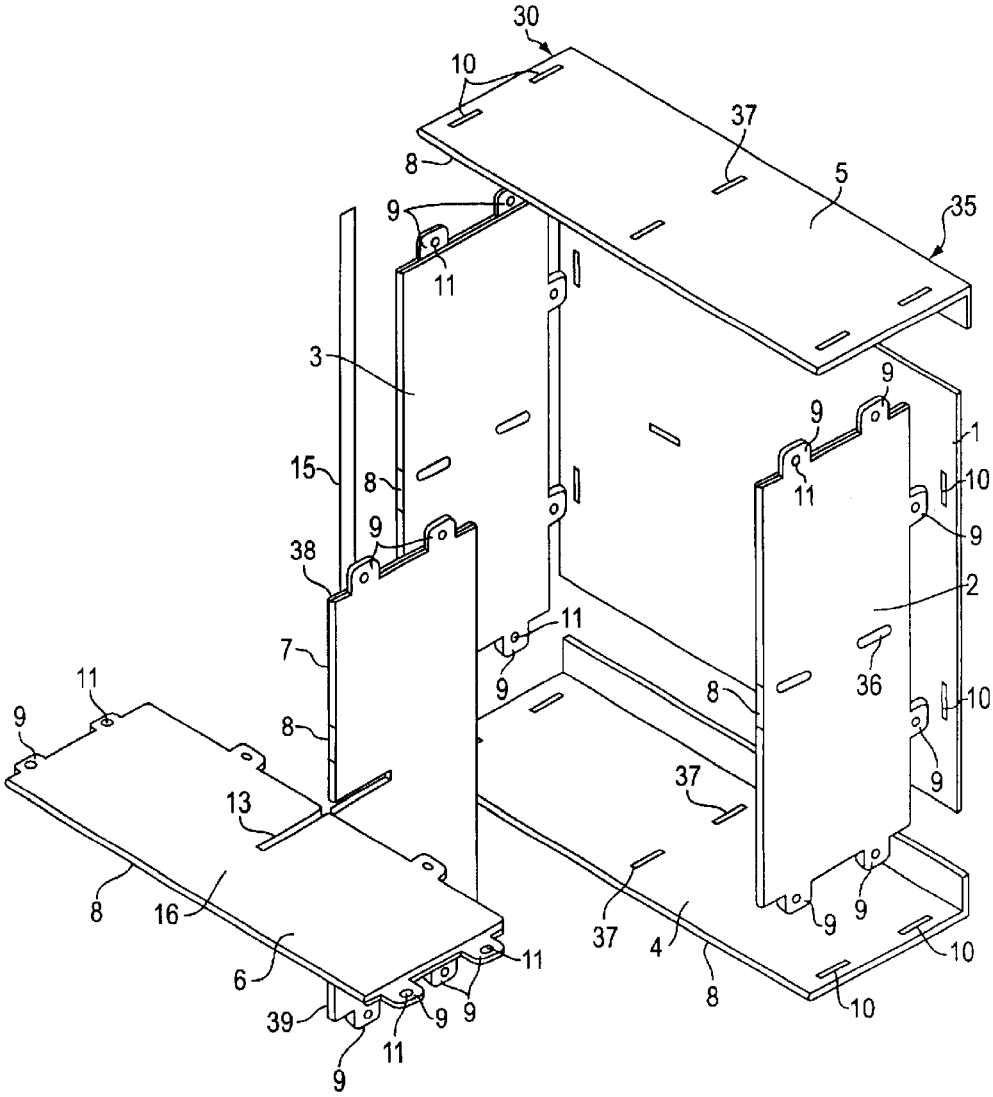
FIG. 1 is an exploded, perspective view of the component shelf system as defined by the invention.

Turning now in detail to the drawings, FIG. 1 shows a component shelf system 30 comprising a frame 35 having a back wall 1, a pair of side walls 2 and 3, a bottom wall 4, and a top wall 5; at least one horizontal compartment divider 6, and at least one vertical compartment divider 7 having a top end 38 and a bottom end 39. Note that only one compartment divider is shown in each case for the sake of simplicity.

Side walls 2 and 3, top wall 5, bottom wall 4 as well as the horizontal compartment divider 6 and vertical compartment divider 7 consist of folded rectangularly shaped cuts from cellular plastic boards each forming a rounded folding edge 8. Using this process, the shelf does not have any sharp edges on the circumferential surfaces of the stabilizing elements or the like as the edges 8 are always rounded.

Side walls 2 and 3 contain at least one horizontal receiving slot 36 and at least one tab 9. Horizontal compartment divider 6 and vertical compartment divider 7 each have at least one tab 9 on one edge of the folded cuts, whereby tab 9 of side walls 2 and 3 are inserted into at least one side receiving slot 10 in back wall 1 and at least one vertical receiving slot 37 in bottom wall 4 and top wall 5 of component shelf system 30. To add further strength, horizontal compartment divider 6 and vertical compartment divider 7 can be secured to each other through a horizontal divider slot 13 on horizontal compartment divider 6 and a vertical divider slot 14 on vertical compartment divider 7.

Top wall 5 and bottom wall 4 contain at least one vertical receiving slot 37 to receive tab 9 from any vertical member. The location and number of vertical receiving slots 37 vary with the number of vertical compartment dividers 7.

Figure 2:
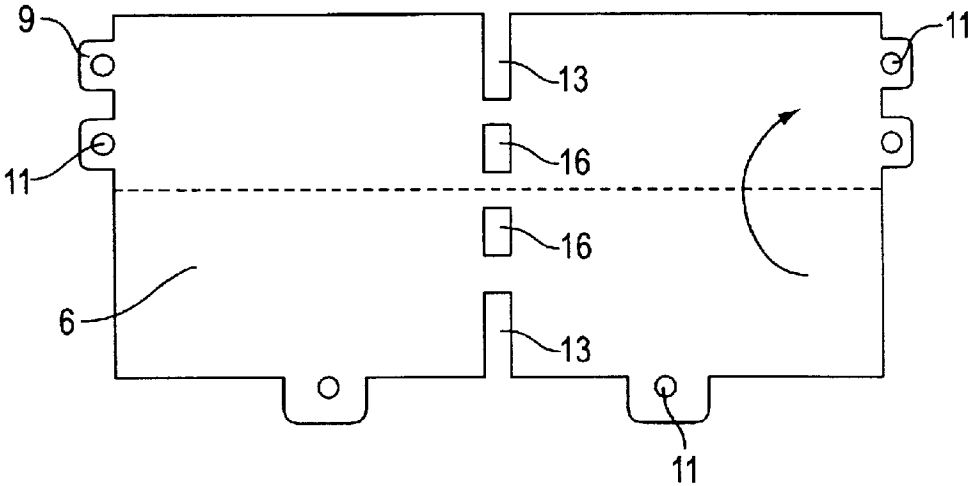
FIG. 2 is a plan view of a horizontal compartment divider.

Referring to FIG. 2, horizontal compartment divider 6 is manufactured from one sheet of material and designed to include tab 9, horizontal divider slot 13, and a splint receiving slot 16. Each tab 9 has a securing bore 11 milled of a particular diameter and at a particular distance on tab 9 depending upon certain factors such as the type of material the shelf is constructed of and the load placed upon the shelf.

Figure 3:
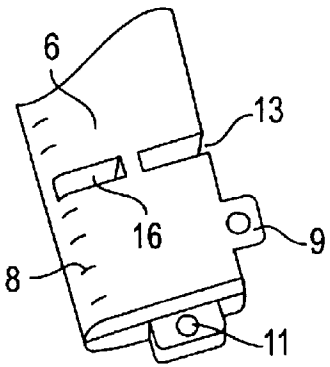
FIG. 3 is a perspective view of one end of a horizontal compartment divider.

Referring the FIG. 3, horizontal compartment divider 6 is folded over to create a finished horizontal compartment divider 6 having rounded folding edges 8. Horizontal compartment divider 6 may either be sealed together using glue, heat treatment, or other suitable bonding process, or be left unsealed.

Figure 4:
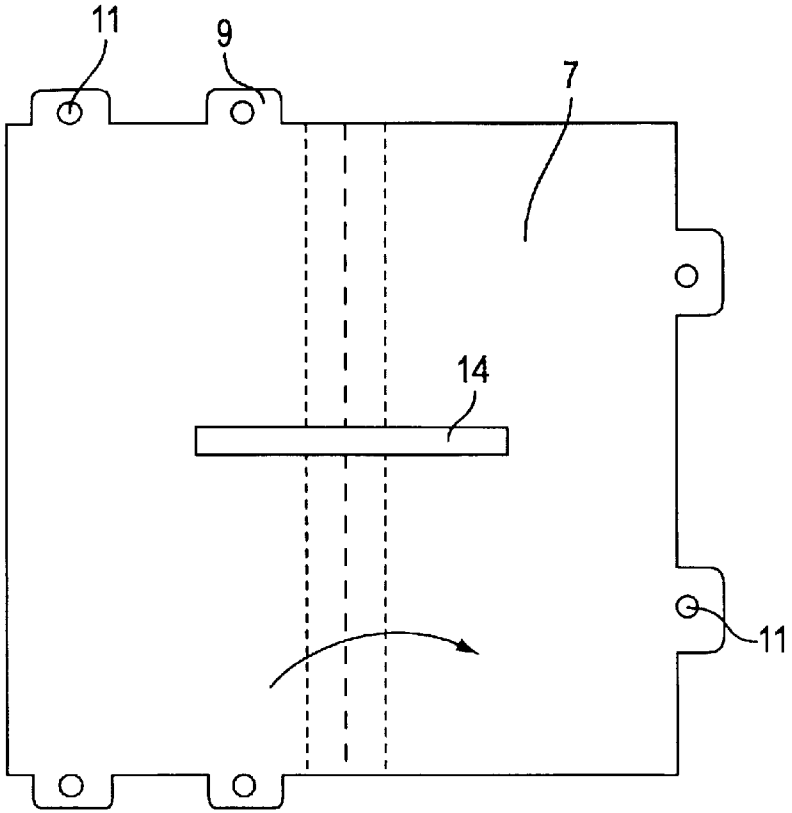
FIG. 4 is a plan view of a vertical compartment divider.

Referring to FIG. 4, vertical compartment divider 7 is manufactured from one sheet of material and designed to include tab 9 and vertical divider slot 14.

Figure 5:
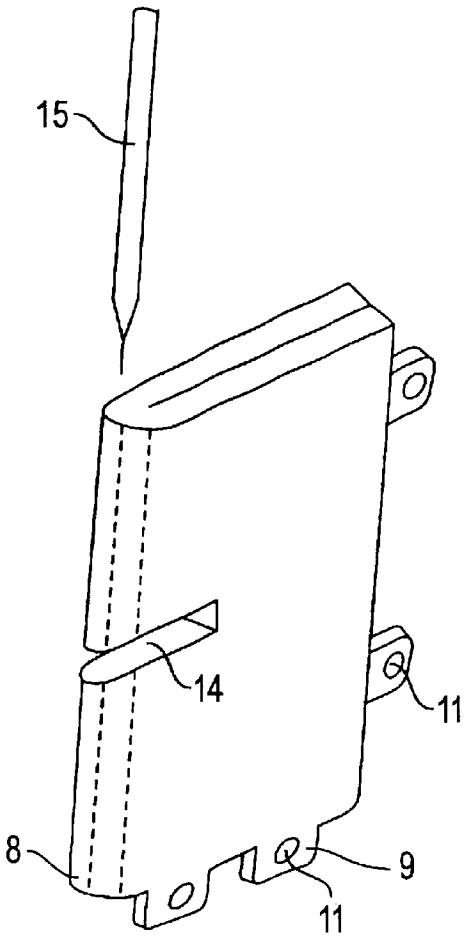
FIG. 5 is a perspective view of a vertical compartment divider.

Referring to FIG. 5, vertical compartment divider 7 is folded over to create a finished vertical compartment divider 7 having rounded folding edges 8. Vertical compartment divider 7 may either be sealed together using glue, heat treatment, or other suitable bonding process, or be left unsealed. When sealing vertical compartment divider 7, care must be taken not to glue the region closest to rounded folding edge 8 as a splint 15 is inserted between the two halves of vertical compartment divider 7 to add strength and durability.

Figure 6:
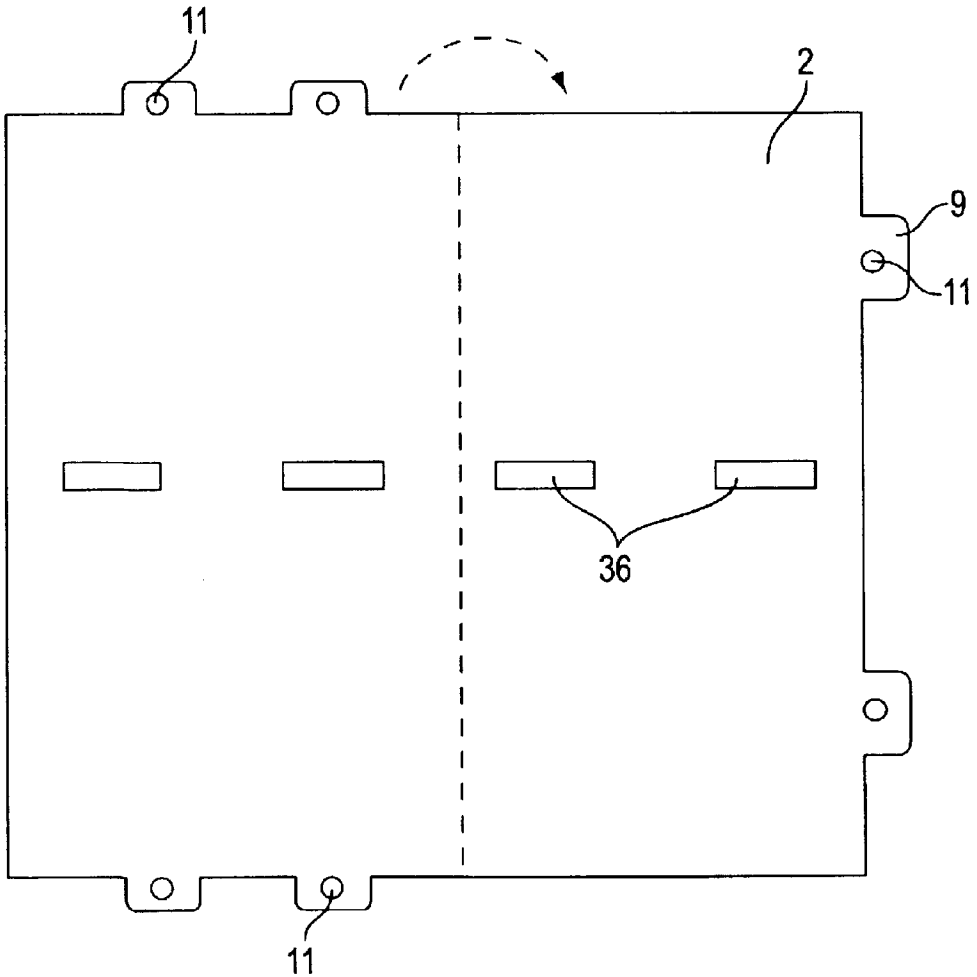
FIG. 6 is a plan view of a side wall.

Referring to FIG. 6, side walls 2 and 3 are similarly manufactured from one sheet of material and designed to include tab 9 and at least one horizontal receiving slot 36.

Figure 7:
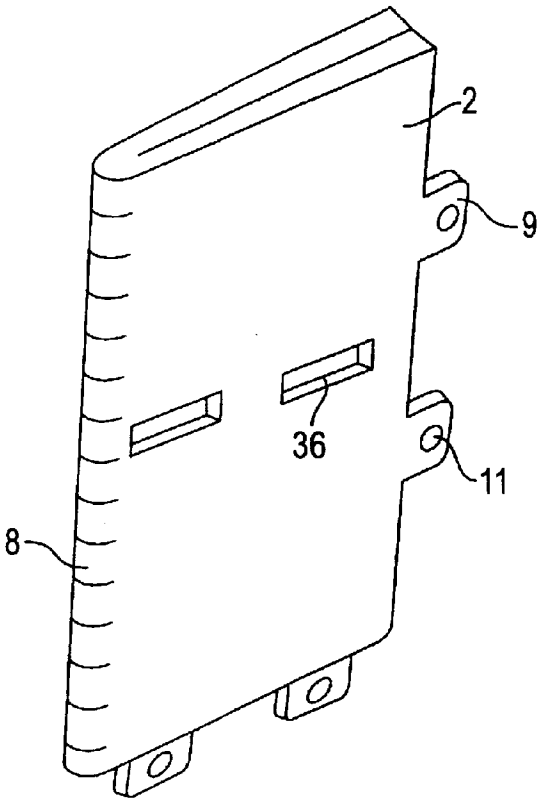
FIG. 7 is a perspective view of a side wall.

Referring to FIG. 7, side walls 2 and 3 are folded over to create finished side walls 2 and 3 are having rounded folding edge 8. Side walls 2 and 3 may either be sealed together using glue, heat treatment, or other suitable bonding process, or be left unsealed.

Figure 8:
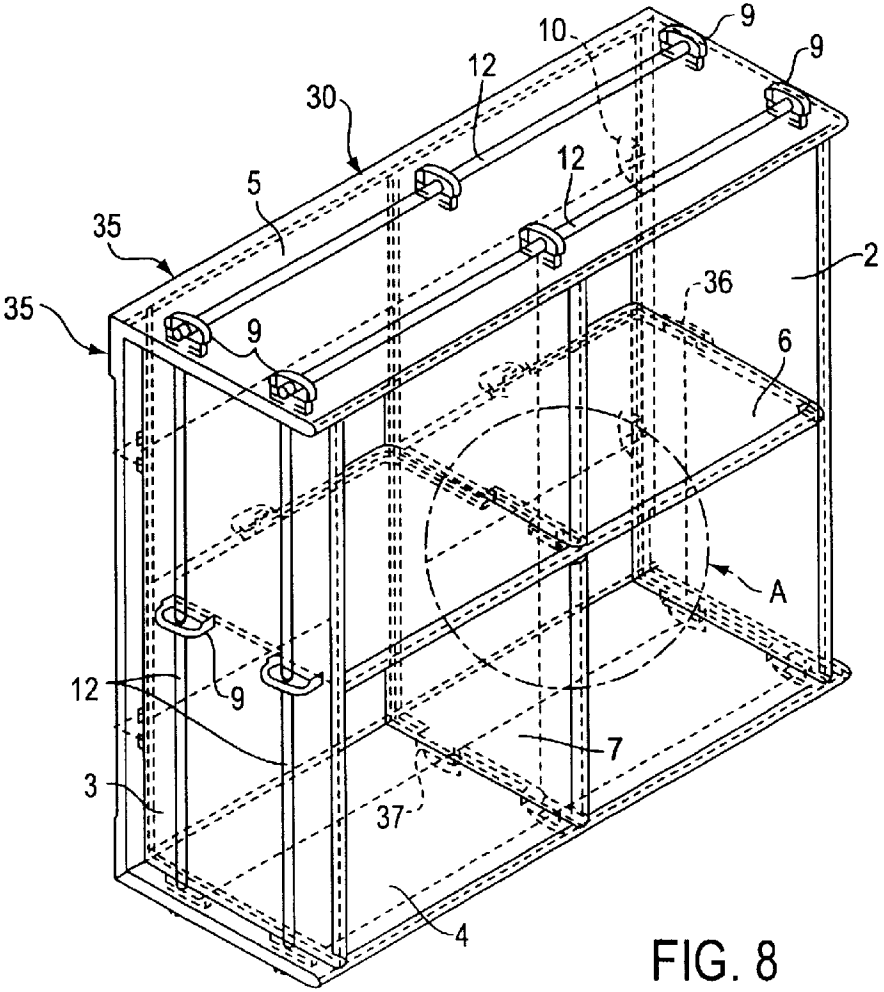
FIG. 8 is an enlarged perspective view of the assembled component shelf system.

Referring to FIG. 8, vertical compartment divider 7 and horizontal compartment divider 6 are inserted into assembled frame 35. Tabs 9 are inserted into corresponding side receiving slot 10, horizontal receiving slot 36 and vertical receiving slot 37. A corresponding number of safety bars 12 are then inserted into securing bores 11 to join and stabilize component shelf system 30.

Figure 9:
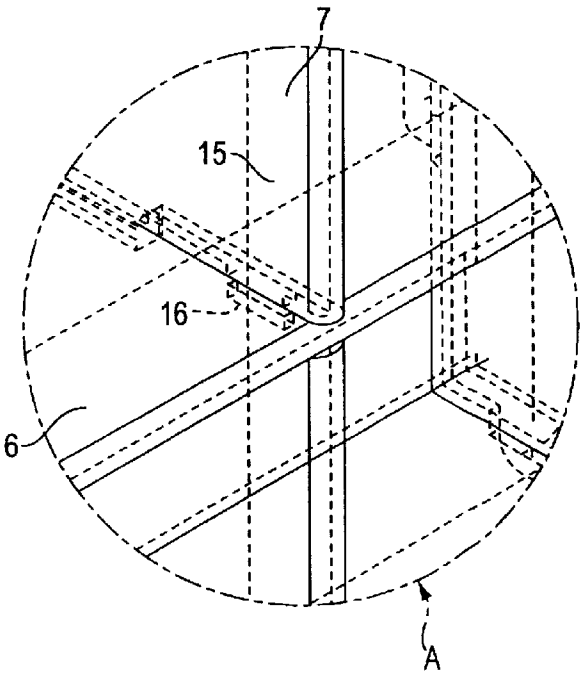
FIG. 9 is an enlarged view of section "A" of FIG. 8.

Referring to FIG. 9, there is shown an enlargement of section A of FIG. 8, referring to the junction between horizontal compartment dividers 6 and vertical compartment dividers 7. Splint 15 is inserted between the folded parts of vertical compartment divider 7 and splint receiving slot 16 in the horizontal compartment divider 6. An interwoven connection is therefore made between the two compartment dividers. In addition, lateral movement of rounded folding edge 8 of vertical compartment divider 7 is prevented.

After component shelf system 30 has been assembled, tabs 9 on the side walls 2 and 3 and on vertical compartment divider 7 are folded over on the underside and fused with bottom wall 4. It is, of course, possible to use as many vertical compartment dividers 7 and horizontal compartment dividers 6 as desired. The horizontal compartment dividers may also be inserted at a downward angle, away from the top wall.

Figure 10:
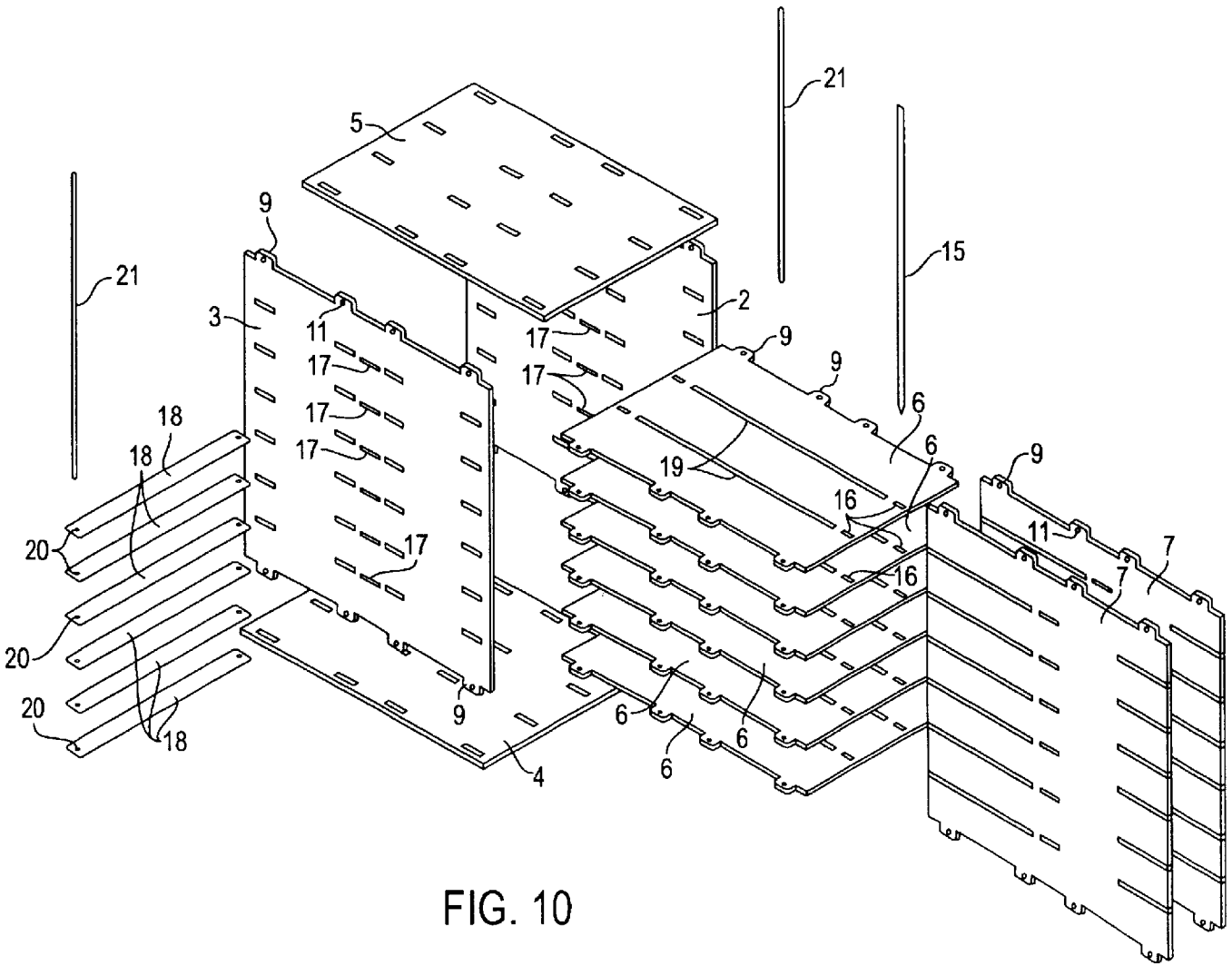
FIG. 10 is an exploded perspective view of an additional embodiment of the component shelf system as defined by the invention.
Figure 12:
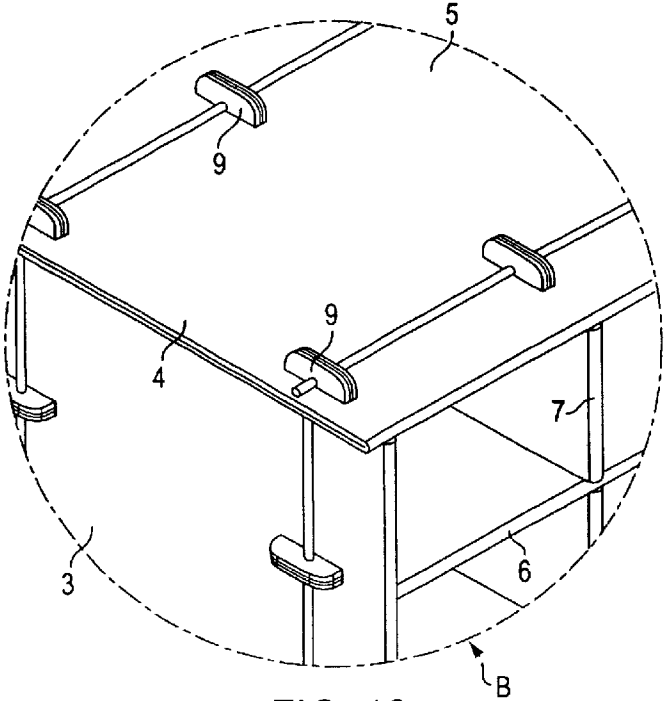
FIG. 12 is an enlarged view of section "B" of FIG. 11.
Figure 11:
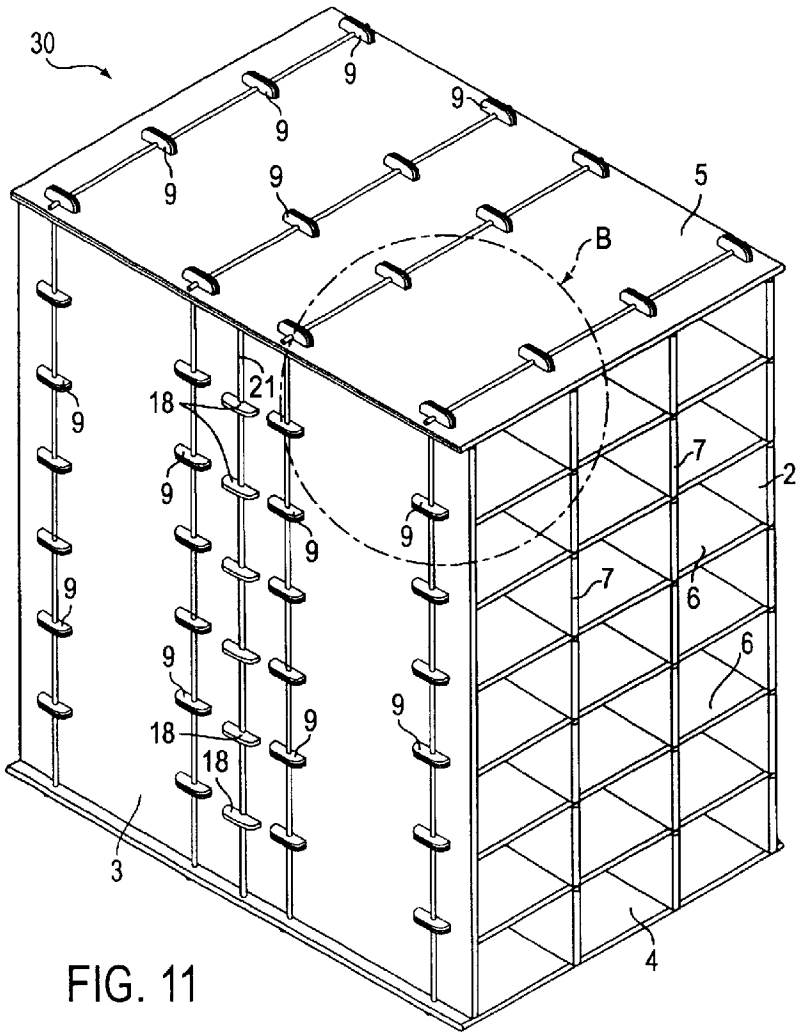
FIG. 11 is a perspective view of the assembled component shelf according to FIG. 10.

Referring to FIGS. 10, 11 and 12, an additional configuration of component shelf system 30 contains two vertical compartment dividers 7 and six horizontal compartment dividers 6. As a back wall or an intermediate wall is missing in the embodiment of the shelf, provision is made in side walls 2 and 3 for at least one support bar receiving slot 17, through which support bars 18 are inserted, the latter supporting horizontal compartment dividers 6 especially in the region of longitudinal slots 19. The two ends of support bar 18 are provided with a support bar securing bore 20, through which a securing bar 21 is inserted. This system of shelf construction results in a particularly stable shelf as perspectively shown in FIG. 11 and shown in detail in FIG. 12.

Figure 13:
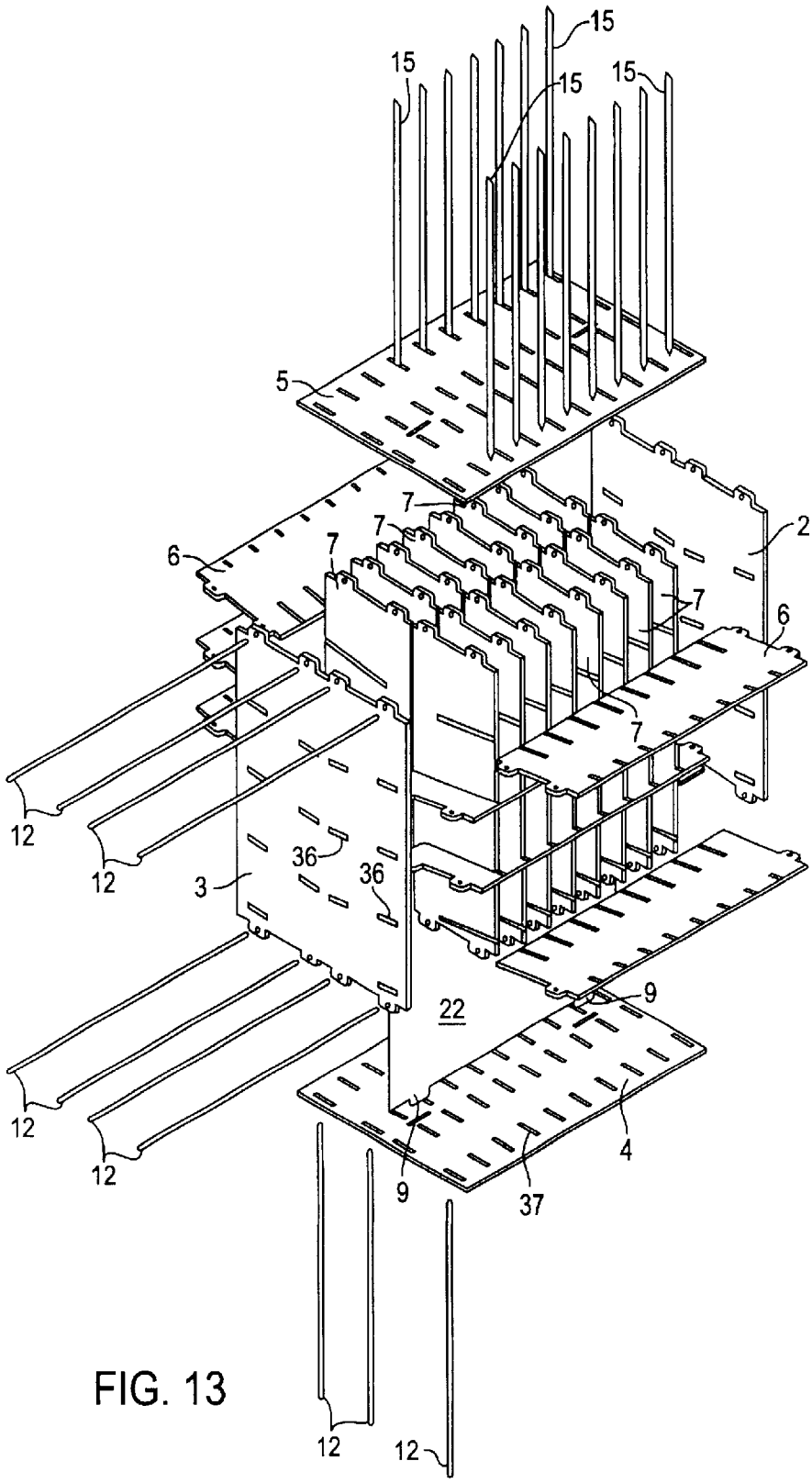
FIG. 13 is an exploded perspective view of an additional embodiment of the component shelf as defined by the invention.

Referring to FIG. 13, there is shown an exploded, perspective view of an alternate configuration of component shelf system 30 as defined in FIG. 1. Side walls 2 and 3 are modified to accommodate two sets of vertical component dividers 7 and horizontal component dividers 6. A center wall 22 acts similar to back wall 1 of FIG. 1. Center wall 22 has tabs 9 which are plugged into corresponding vertical receiving slots 37 on bottom wall 4, and into corresponding vertical receiving slots of top wall 5.

Figure 15:
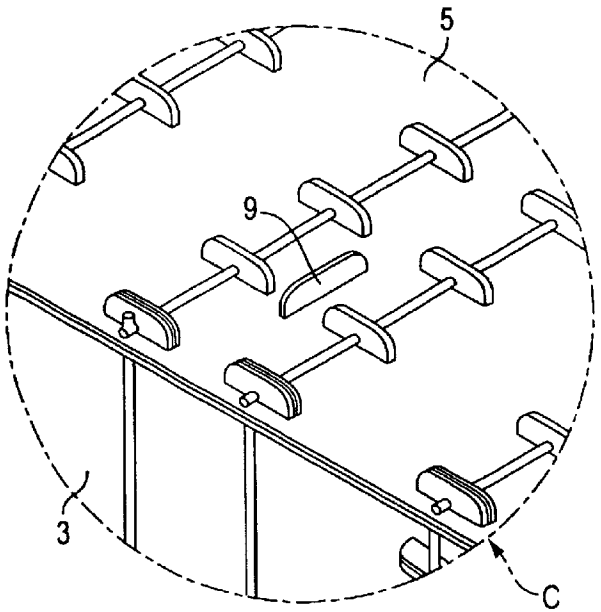
FIG. 15 is an enlarged view of section "C" of FIG. 14.
Figure 14:
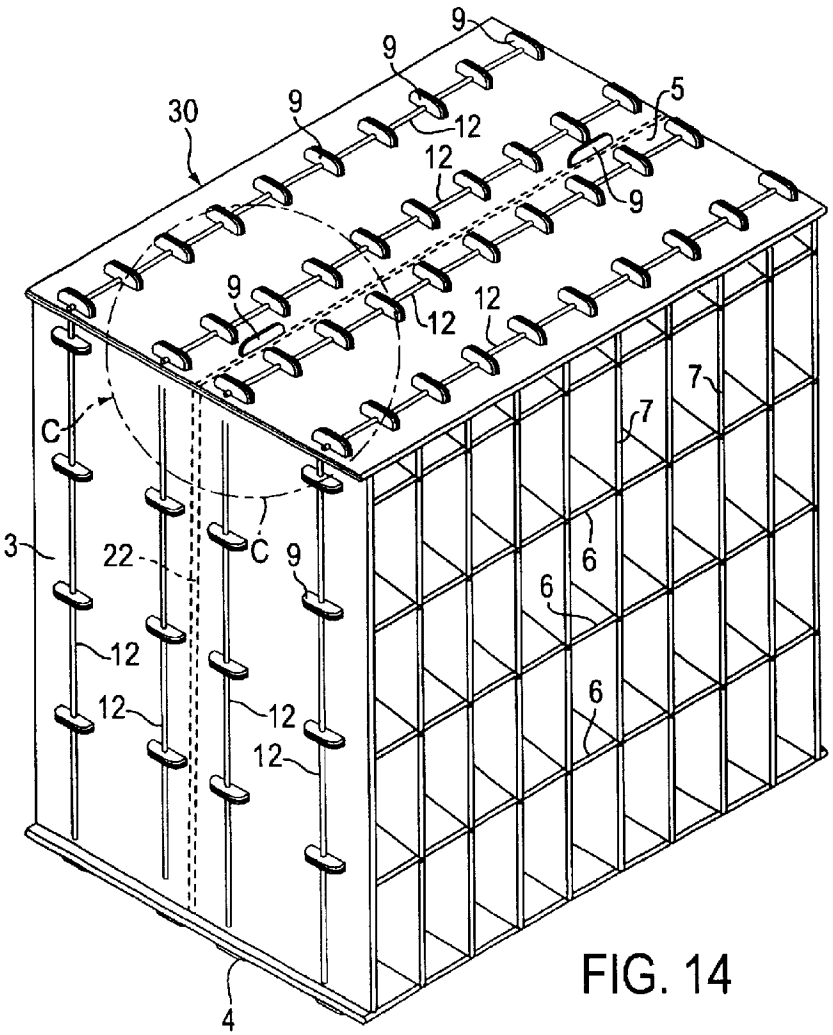
FIG. 14 is a perspective view of the assembled component shelf according to FIG. 13.

As shown perspectively in FIG. 14 and by a detail of FIG. 14 in FIG. 15, this system results in an extremely stable shelf which is accessible from both sides.

Of course, the features of the invention can be applied in connection with shelves where no provision is made for additional horizontal compartment dividers as is formed only by the bottom and the top components.

While several embodiments of the present invention have been shown and described, it is to be understood that many changes and modifications may be made thereunto without departing from the spirit and scope of the invention as defined in the appended claims.

What is claimed is:

1. A component shelf system comprising:

a frame having a back wall, a pair of side walls, a top wall and a bottom wall, all of said walls being attached to each other with a plurality of tabs and corresponding slots disposed on said back wall, said side walls, said top wall and said bottom wall, wherein said back wall, said side walls, said top wall and said bottom wall are constructed of folded material and said tabs are inserted through said slots;

a securing bore disposed on each of said tabs and milled to a particular diameter corresponding to the type of material used to construct said shelf system and the load supported; and a plurality of safety bars inserted through each of said securing bores disposed on said tabs wherein said safety bars prevent the removal of said tabs from said slots.

2. The component shelf system of claim 1, wherein said tabs projecting through said bottom wall are folded over 90° and secured to said bottom wall.

3. The component shelf system of claim 1, further comprising:

at least one vertical compartment divider, constructed of folded material, having a top end and a bottom end, and at least one tab with a securing bore, wherein said at least one vertical compartment divider is attached to said frame using said at least one tab and slots on said top and bottom wall, said at least one tab being secured using a safety bar inserted through said at least one vertical divider securing bore.

4. The component shelf system of claim 1, further comprising:

at least one horizontal compartment divider, constructed of folded material, having at least one tab with a securing bore, wherein said at least one horizontal compartment divider is attached to said frame using said at least one tab and corresponding slots, on said pair of side walls, said at least one tab being secured using said safety bars inserted through said at least one horizontal divider securing bore.

5. The component shelf system of claim 1, further comprising:

at least one vertical compartment divider, constructed of folded material, having a top end and a bottom end, and at least one tab with a securing bore, wherein said at least one vertical compartment divider is attached to said frame using said at least one tab and corresponding slots disposed on said top wall and said bottom wall, said at least one tab being secured using said safety bars inserted through said at least one vertical divider securing bore; and at least one horizontal compartment divider, constructed of folded material, having at least one tab with a securing bore, wherein said at least one horizontal compartment divider is attached to said frame using said at least one tab and corresponding slots disposed on said pair of side walls, said at least one tab being secured using said safety bars inserted through said at least one horizontal divider securing bore.

6. The component shelf system of claim 5, further comprising:

at least one support bar receiving slot disposed on said pair of side walls; and at least one support bar having a pair of ends inserted through said support bar receiving slots, wherein said support bar extends beneath said horizontal compartment divider and supports the center of said divider.

7. The component shelf system of claim 6, further comprising:

at least one support bar securing bore disposed on said support bar ends; and at least one securing bar, wherein said securing bar is inserted into said support bar securing bore so that said support bar is fixed in place.

8. The component shelf system of claim 5, further comprising:

at least one horizontal divider slot disposed on said horizontal compartment divider;

at least one splint receiving slot disposed on said horizontal compartment divider, wherein said horizontal divider slot and said splint receiving slot are co-linear; and at least one vertical divider slot disposed parallel to said top and said bottom end of said vertical compartment divider, wherein said vertical divider slot and said horizontal divider slot mate to attach said horizontal compartment divider to said vertical compartment divider.

9. The component shelf system of claim 8, further comprising:

a splint inserted between said folded vertical compartment dividers and directly opposite said back wall, wherein after said horizontal compartment dividers are installed, said splint passes through said splint receiving slot on said horizontal compartment divider, so that said splint prevents any movement of said vertical or said horizontal compartment dividers.

10. The component shelf system of claim 8, wherein said at least one vertical divider slot extends on a downward angle toward said back wall, so that said horizontal compartment dividers may be inserted at a downward angle, away from said top wall.

11. The component shelf system of claim 5, wherein the side, top and bottom walls extend beyond said back wall and form a center wall, and wherein there are horizontal and said vertical compartment dividers disposed and secured on both sides of said center wall.

*12. A component shelf system comprising:*

*a frame having a back wall, a pair of side walls, a top wall and a bottom wall, all of said walls being attached to each other with a plurality of tabs and corresponding slots disposed on said back wall, said side walls, said top wall and said bottom wall, wherein said back wall, said side walls, said top wall and said bottom wall are constructed of folded material and said tabs are inserted through said slots;*

*a securing bore disposed on each of said tabs; and*

*a plurality of safety members inserted through each of said securing bores disposed on said tabs wherein said safety members prevent the removal of said tabs from said slots.*

*13. A component shelf system comprising:*

*a frame having a back wall, a pair of side walls, a top wall and a bottom wall, all of said walls being attached to each other with a plurality of tabs and corresponding slots disposed on said back wall, said side walls, said top wall and said bottom wall, wherein said back wall, said side walls, said top wall and said bottom wall are constructed of folded material and said tabs are inserted through said slots;*

*an opening through each of said tabs; and*

*a plurality of safety members inserted through each of said openings disposed on said tabs wherein said safety members prevent the removal of said tabs from said slots.*

* * * * *